United States Patent [19]
Kuo et al.

[11] 3,809,990
[45] May 7, 1974

[54] ELECTRIC MOTOR ADAPTED FOR BOTH STEPPING AND CONTINUOUS OPERATION

[75] Inventors: Benjamin C. Kuo, Champaign; Kenneth S. Kordik, Rockton, both of Ill.

[73] Assignee: Warner Electric Brake and Clutch Company, Beloit, Wis.

[22] Filed: July 27, 1972

[21] Appl. No.: 275,732

[52] U.S. Cl.................... 318/696, 310/49, 318/685
[51] Int. Cl. .............................................. H02k 37/00
[58] Field of Search ...... 310/49; 318/138, 254, 696, 318/685

[56] References Cited
UNITED STATES PATENTS

| | | | |
|---|---|---|---|
| 3,523,230 | 8/1970 | York | 318/685 |
| 3,476,996 | 11/1969 | Fredriksen | 318/696 |
| 2,744,922 | 12/1956 | Thomas | 310/49 X |
| 1,914,481 | 6/1933 | Brown | 318/696 |
| 2,578,648 | 12/1951 | Thomas | 318/696 X |
| 2,797,346 | 6/1957 | Ranseen | 310/49 |
| 3,206,623 | 9/1965 | Snowdon | 310/49 |

Primary Examiner—G. R. Simmons
Attorney, Agent, or Firm—Wolfe, Hubbard, Leydig, Voit and Osann

[57] ABSTRACT

An electric motor adapted for operation in either a stepping mode or a continuous mode. The stator assembly of the motor includes three magnetically independent stator sections spaced along a common axis with each section forming a plurality of magnetic poles of alternating polarity around the circumference thereof, and having a plurality of teeth with the teeth of each stator section circumferentially offset from the teeth of one of the other sections by distance equal to the tooth pitch divided by the number of stator sections. The stator assembly is wound with a multi-phase winding having a separate phase wound on each stator section and connected to a common d-c. voltage source. A plurality of transistors are connected in circuit with the voltage source and each phase of the stator winding for selectively energizing each of the phases independently of the other. A rotor assembly is journalled for rotation in all the stator sections and has teeth with the same pitch as the teeth on the stator sections, and has a winding wound between the rotor teeth. A commutator is connected from the d-c. voltage source to the rotor winding for converting d-c. current from the source to a-c. current in the winding when the rotor assembly is turned. Switches connect and disconnect the voltage source from the commutator, and a plurality of gates actuate the transistors to control the energization of the various phases of the stator winding. When the motor is operated in the continuous mode, all the gates are enabled at the same time to actuate all the transistors to continuously energize all the phases of the stator winding so as to effect continuous rotation of the rotor, while the commutator is connected to the voltage source. In the stepping mode, a pulse generator produces pulses which are fed to a counter for producing output signals sequentially on a series of output lines for enabling the gates in sequence to turn on the transistors in sequence, thereby energizing the various phases of the stator winding in sequence to effect stepping rotation of the rotor assembly in synchronism with the pulses from the pulse generator.

17 Claims, 12 Drawing Figures

3,809,990

ELECTRIC MOTOR ADAPTED FOR BOTH STEPPING AND CONTINUOUS OPERATION

DESCRIPTION OF THE INVENTION

The present invention relates generally to electric motors and, more particularly, to electric motors that are capable of operating as stepping motors.

It is a primary object of the present invention to provide an improved electric motor which can be operated either in a step mode for effecting predetermined increments of angular displacement with a detent torque, or in a continuous mode for effecting continuous rotation at high speeds.

Another object of the invention is to provide such an improved motor which provides, in the step mode, a high ratio of torque to inertia, high stepping rates and fast response.

It is a further object of the invention to provide an improved electric motor of the foregoing type which is bi-directional.

A still further object of the invention is to provide such an improved electric motor which has a relatively simple construction and a long operating life.

Other objects and advantages of the invention will become apparent upon reading the attached detailed description and upon reference to the drawings, in which.

While the invention will be described in connection with certain preferred embodiments, it is to be understood that the invention is not limited to these particular embodiments. On the contrary, it is intended to cover all alternatives, modifications, and equivalent arrangements as may be included within the spirit and scope of the invention.

Figure 1:
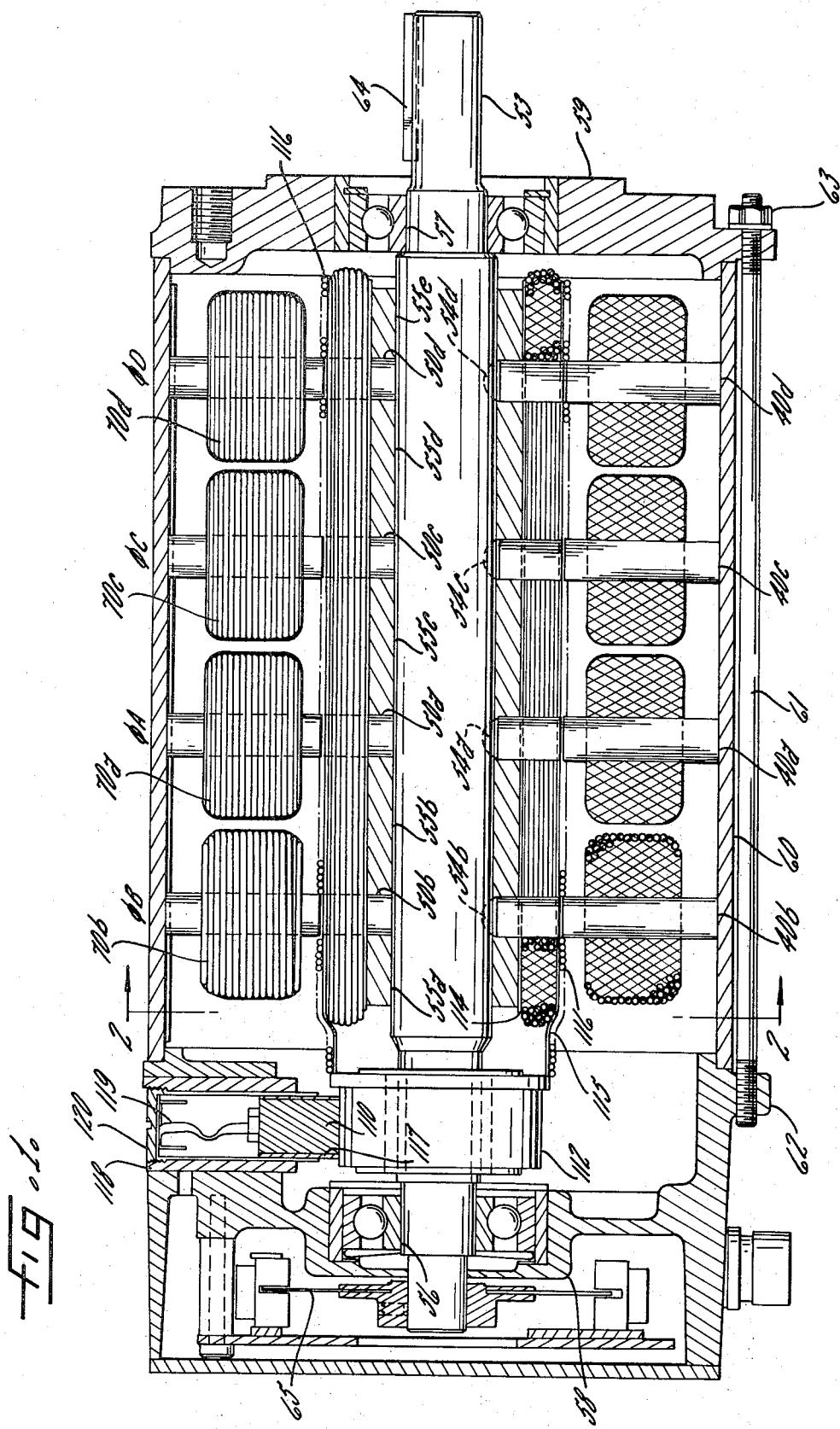
FIG. 1 is a section taken through the middle of an electric motor embodying the invention, with the motor shaft and commutator shown in full elevation.

Turning now to the drawings and referring first to FIG. 1, there is shown a variable reluctance d-c. motor that includes four stator-rotor pairs, which are commonly referred to as "phases." The four phases in the illustrative motor are identified as phases A, B, C and D. Each of the stator sections 40a, 40b, 40c and 40d in the four-phase stator assembly comprises a laminated stack of thin soft iron plates forming an outer annulus 41 (FIG. 2) and four radially inwardly extending poles 42, 43, 44 and 45. The arcuate inner end of each of the poles 42–45 forms five equally spaced pole teeth, e.g., the pole 42 forms five equally spaced teeth 42a, 42b, 42c, 42d and 42e, so that the combination of the four poles on each stator section forms a total of 20 pole teeth arranged in a circle concentric with the annulus 41.

Disposed within the circles of pole teeth formed by the four stator sections are four rotor sections 50a, 50b, 50c and 50d each comprising a laminated stack of magnetically permeable soft iron plates forming an inner annulus 51 (FIG. 2) and a plurality of equally spaced teeth 52 extending radially outwardly from the annulus 51. The outer end of each tooth 52 forms a pair of oppositely extending ears 52a 52b to form an enlarged area on the face of the tooth for cooperating with the opposed stator teeth 42a, 42b, etc. The angular spacing of the rotor teeth is the same as that of the stator teeth so that the angular relationship between any one pair of rotor and stator teeth is the same as that for all other pairs of rotor and stator teeth. In the illustrative arrangement, each rotor section has 24 equally spaced teeth, and the pitch of both the rotor and stator teeth is 15°.

The four rotor sections 50a, 50b, 50c and 50d are all keyed to a common shaft 53 by means of keys 54a, 54b, 54c and 54d so as to form a single unitary rotor assembly. The teeth 52 of the four rotor sections are all in axial alignment with each other, and the four sections are axially spaced from each other by means of spacer sleeves 55a–55e, made of a non-magnetizable material such as aluminum, which also support the rotor winding to be described below. When the rotor assembly is rotated, it turns the shaft 53 in a pair of bearing assemblies 56 and 57 mounted in a pair of end plates 58 and 59, respectively. The end plates 58 and 59, in turn, are fastened to opposite ends of a cylindrical housing 60 by means of a plurality of elongated rods 61 which are threaded into lugs 62 on the end plate 58 and secured to the opposite end plate 59 by means of nuts 63. The right hand end of the shaft 53, as viewed in FIG. 1, carries a key 64 for connecting the motor shaft to a selected load, while the left hand end of the shaft carries a disc 65 which is part of a pair of conventional pulse generators for indicating the direction and magnitude of motor displacement.

The four stator sections 40a, 40b, 40c and 40d are all keyed to the inside of the cylindrical housing 60, in radial alignment with the four corresponding rotor sections 50a, 50b, 50c and 50d, respectively, by means of keys 61a, 61b, 61c and 61d fitting into corresponding keyways 62a, 62b, 62c and 62d formed in the outside surfaces of the stator sections 40. As can be seen most clearly in FIG. 2, the radial dimensions of the cooperating stator and rotor assemblies are such that a small air gap is formed between the cooperating teeth of the stator and rotor sections in each phase.

For the purpose of magnetizing each stator section 40, a winding 70 is wound around the four poles 42, 43, 44 and 45 in a pattern such that adjacent poles have opposite polarities when the winding 70 is energized, thereby forming magnetic poles of alternating polarity around each rotor section 50 to produce a magnetic field extending across the air gap between the rotor and stator assemblies. Thus, in the illustrative embodiment of FIG. 2, poles 42 and 44 are north poles, while poles 43 and 45 are south poles. Whenever the winding 70 of any one of the four phases is energized, the resulting magnetization of the stator poles 42–45 in that phase attracts the corresponding soft iron rotor section 50 and thereby causes the rotor teeth to move into alignment with the stator teeth, which is the position of minimum reluctance, i.e., minimum resistance to magnetic flux. Each of the windings 70a, 70b, 70c and 70d in the four-phase stator winding is connected for energization independently of the other three windings, and each of the four stator sections is magnetically independent of the other three stator sections, so that the effect of each stator section on the unitary rotor assembly is independent of the other three stator sections.

In order to advance the rotor assembly in preselected increments while also providing directional control for the variable reluctance motor, the stator sections of the four phases A, B, C and D are circumferentially or angularly offset from each other by one-fourth of a tooth pitch, while the teeth of the four rotor sections are all in axial alignment with each other. Thus, as can be seen most clearly in FIGS. 2 and 3, the keyways 62a–62d for the four stator sections are offset from one another by 3.75°, which is 15° (the tooth pitch) divided by 4 (the number of phases). Consequently, when the phase A stator winding 70a is energized, the rotor teeth in phase A line up with the stator teeth in phase A, but the rotor teeth in phases B, C and D are offset from their respective stator teeth by one-fourth, two-fourths and three-fourths of a tooth pitch, respectively. When the winding 70b of phase B is then energized, the rotor teeth in phase B line up with the stator teeth in phase B, thereby displacing the rotor assembly by one-fourth of a tooth pitch (3.75°), which represents one "step" of the motor. Furthermore, the direction of rotor displacement is in the clockwise direction as determined by the fact that the stator section of phase B is offset from the stator section of phase A in the clockwise direction. However, if the phases are energized in the reverse order, i.e., first phase B, then phase A, the motor steps in the counterclockwise direction, although the size of the step is the same, namely one-fourth of a tooth pitch. It can thus be seen that sequential energization of the four phases of the stator winding steps the magnetic poles formed by the stator assembly circumferentially around the air gap between the rotor and stator assemblies, thereby effecting stepping rotation of the rotor assembly.

Figure 4:
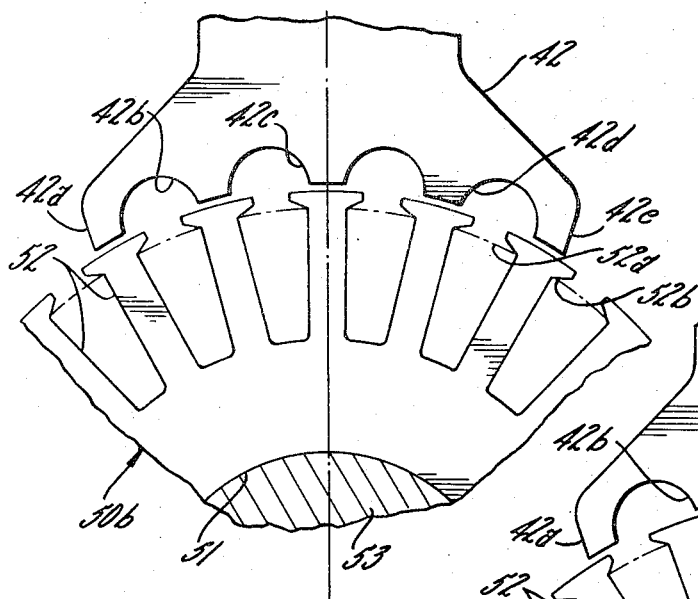
FIG. 4 is an enlarged elevation of one set of stator teeth and the adjacent rotor teeth in the motor of FIG. 1 with the windings of a first stator energized.
Figure 5:
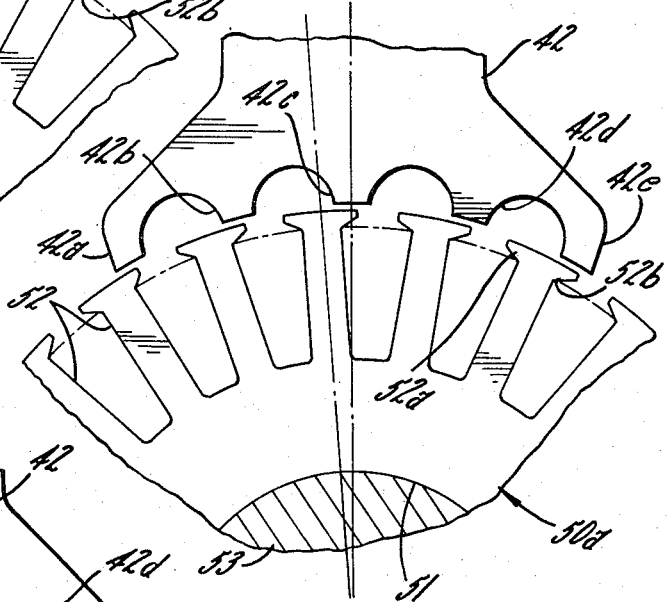
FIG. 5 is an enlarged elevation of the same stator and rotor teeth shown in FIG. 4 with the windings of a second stator energized.
Figure 6:
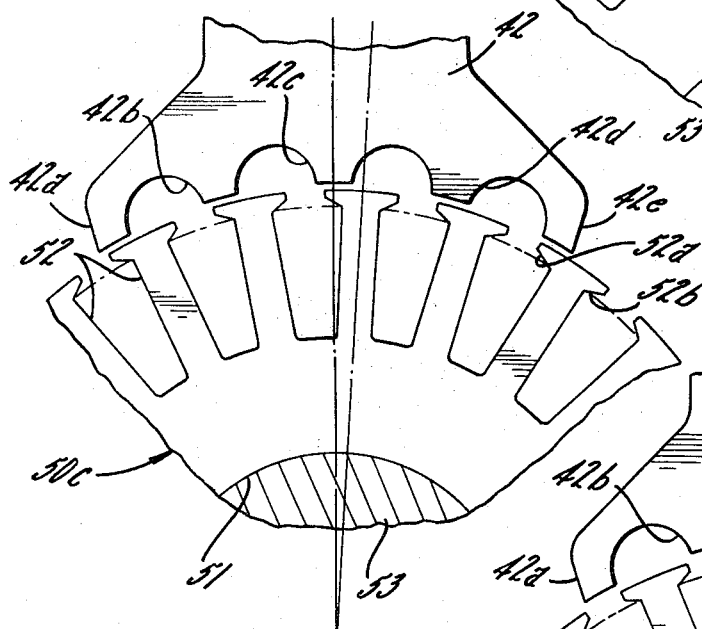
FIG. 6 is an enlarged elevation of the same stator and rotor teeth shown in FIG. 4 with the windings of a third stator energized.
Figure 7:
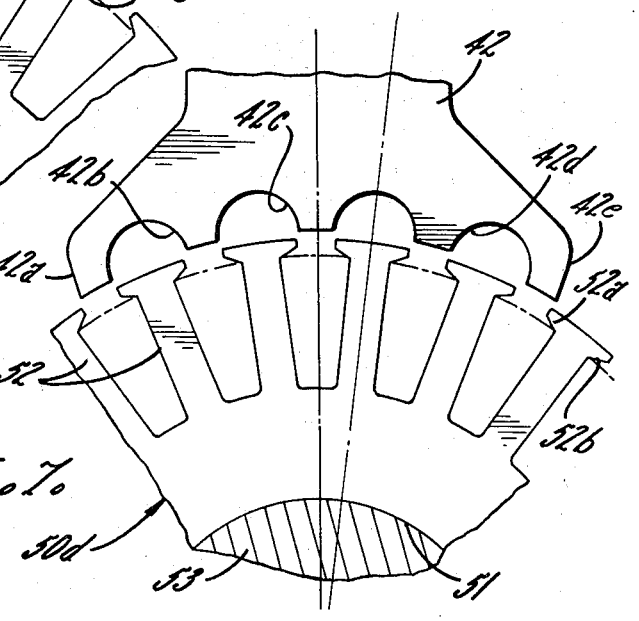
FIG. 7 is an enlarged elevation of the same stator and rotor teeth shown in FIG. 4 with the windings of a fourth stator energized.

Operation of the illustrative motor is more clearly illustrated in FIGS. 4–6, which show the positions of the rotor and stator teeth of all four phases A through D when the stator winding 70b of phase B is energized. As shown in FIG. 4, the teeth of rotor section 50b are drawn into alignment with the stator teeth of phase B, since that is the position of minimum reluctance when the phase B winding 70b is energized. As long as phase B is energized, the stator windings of the other three phases are de-energized with the stator teeth of phase A spaced 3.75° to one side of the rotor teeth (FIG. 5), the stator teeth of phase C spaced 3.75° to the other side of the rotor teeth (FIG. 6), and the stator teeth of phase D spaced 7.5° to the same side of the rotor teeth as the stator teeth of phase C (FIG. 7). Although the illustrative motor has four phases, it will be understood that only three phases are necessary in order to control the direction of the motor. Similarly, the number of phases employed may be greater than four, provided the motor is constructed to accomodate the desired number of phases without allowing excessive flexing of the rotor shaft 53 due to the magnetic forces exerted on the rotor assembly mounted thereon. It will be understood that the rotor shaft 53 cannot be allowed to flex more than the clearance between the cooperating rotor and stator teeth, or otherwise the rotor teeth will drag on the stator and degrade the motor performance.

Figure 2:
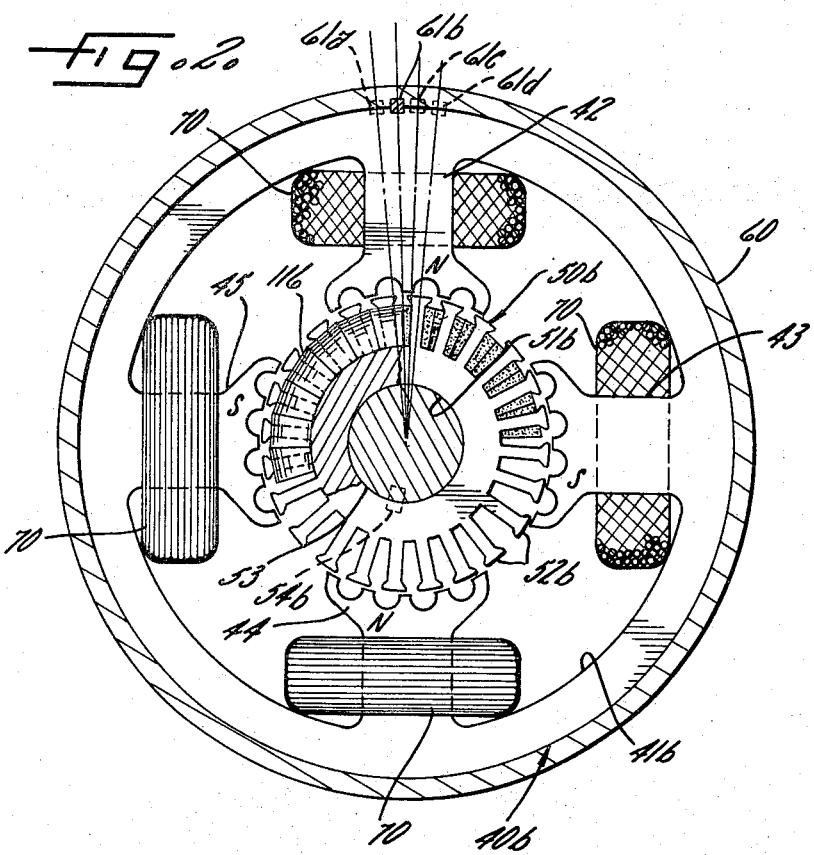
FIG. 2 is a section taken along line 2—2 in FIG. 1.
Figure 3:
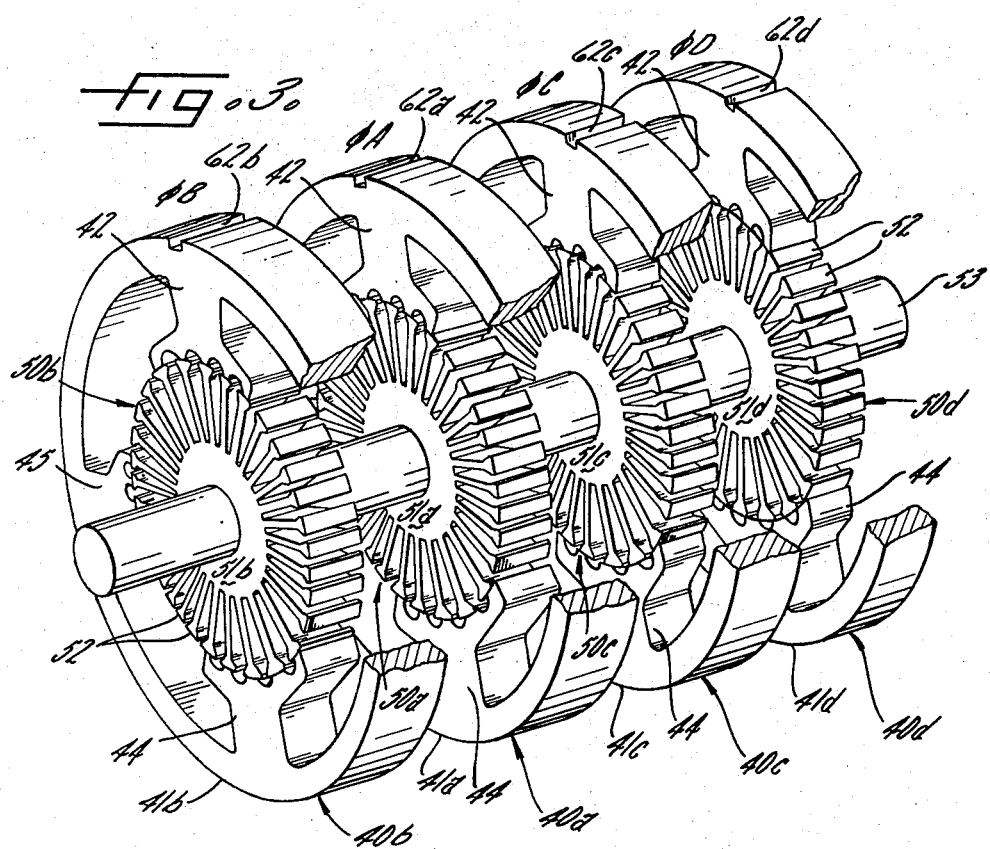
FIG. 3 is a perspective of the rotor-stator assemblies in the motor of FIG. 1 with fragments thereof broken away to show the alignment of the multiple rotors.

To minimize the distance between any pair of successively energized phases of the illustrative motor to minimize the effect of any mechanical errors in the motor structure (e.g., deviations between the rotor and stator axes), the four phases are physically arranged in the order B, A, C, D rather than A, B, C, D, although the phases are electrically energized in the order A, B, C, D. Thus, as can be seen in FIGS. 2 and 3, the keyways for the four stator sections 40 are arranged so that the stator section 40a of phase A is offset 3.75° in the counterclockwise direction from the keyway of stator 40b of phase B, while the keyway of the stator section 40c of phase C is offset 3.75° in the clockwise direction from the keyway of the stator section of phase B. The keyway of the stator section 40d for phase D is offset 3.75° in the clockwise direction from the keyway of stator section 40c for phase C. Consequently, when the four stator windings 70a–70d are energized in the sequence A, B, C, D, it can be seen that the motor will be stepped by successive increments of 3.75° in the clockwise direction. However, there is never more than one phase interposed between any pair of successively energized phases. More specifically, phase B is directly adjacent phase A; phase C is spaced away from phase B by only one phase, namely phase A; phase D is directly adjacent phase C; and phase A is spaced away from phase D by only phase, namely phase C.

Figure 8:
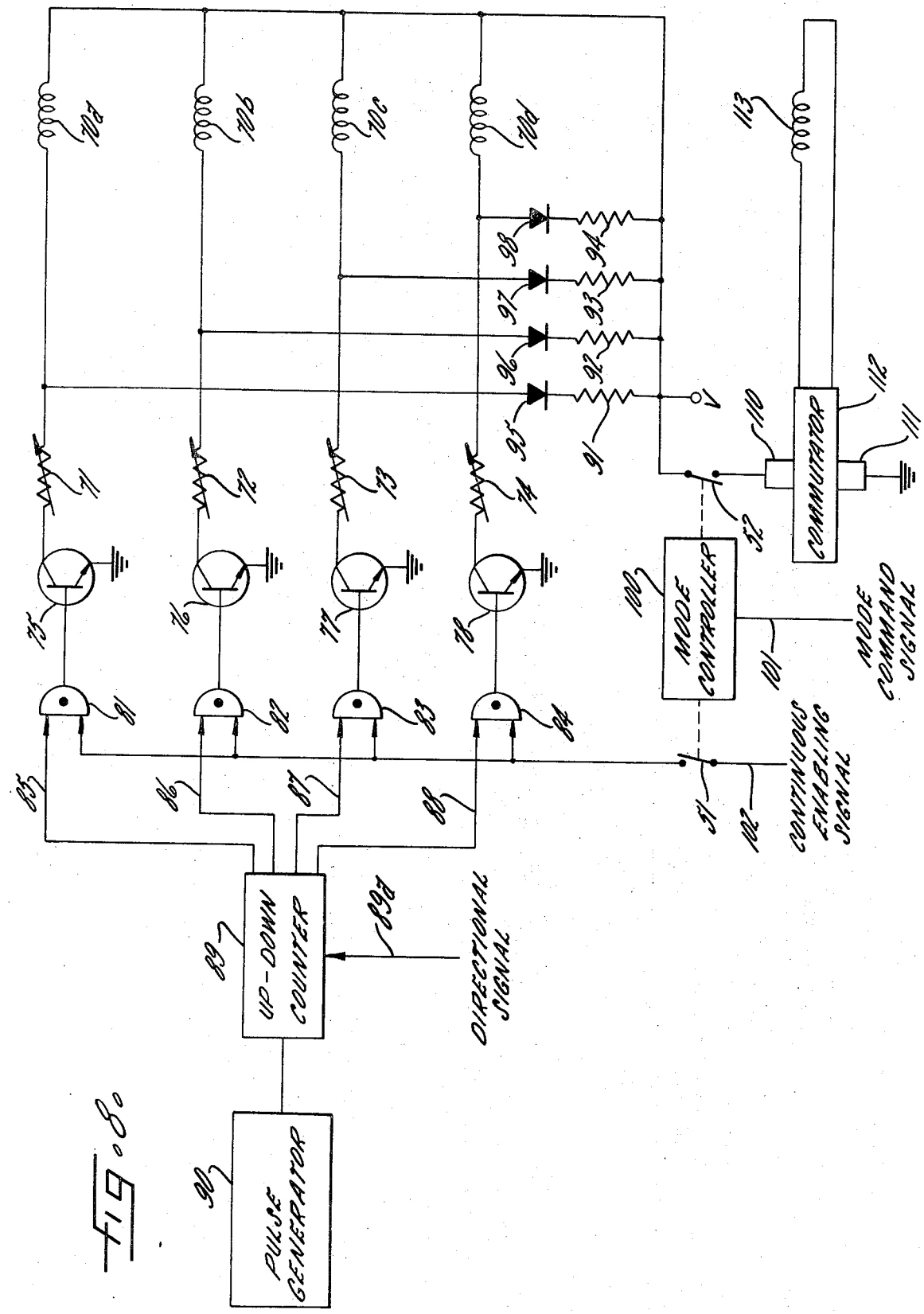
FIG. 8 is a schematic diagram of the electrical system for energizing the stator and rotor windings in the motors of FIGS. 1-7 and 9-12.

In FIG. 8 there is illustrated a control system for automatically energizing the stator windings 70a–70d of the four phases A, B, C, D in sequence so as to step the motor through any desired angular displacement in synchronism with the sequential energization of the multiple-phase stator winding. Thus, each of the four stator windings 70a, 70b, 70c and 70d is connected to a common d-c voltage source V, with the energizing circuit to each stator winding being completed to ground through a current-limiting resistor 71, 72, 73 or 74, and a transistor 75, 76, 77 or 78. In order to energize a selected phase of the stator winding, the corresponding transistor is rendered conductive by a signal from one of four OR circuits 81, 82, 83 or 84, which in turn receives an enabling signal from one of four output lines 85, 86, 87 or 88 from a conventional up-down counter 89, e.g., a 74192 integrated circuit. The counter 89 produces output signals sequentially on the four output lines 85–88 in response to input pulses from a pulse generator 90. When the counter 89 produces an output signal on line 85, for example, the signal is gated through the OR circuit 81 to the base of the transistor 75, thereby rendering the transistor 75 conductive to complete the energization circuit for the phase A stator winding 70a. When the next input pulse is received from the generator 90, the counter output is switched from line 85 to line 86, thereby rendering the transistor 75 nonconductive to de-energize the winding 70a, and rendering the transistor 76 conductive via OR circuit 82 to energize the phase B winding 70b. Succeeding pulses from the generator 90 produce counter output signals on lines 87 and 88 to effect successive energization of the windings 70c and 70d of phases C and D, respectively, after which the winding 70a of phase A is energized again to initiate another cycle of stepping operation of the motor. Thus, the transistors 75–78 function as electronic switching means for selectively energizing each of the various phases of the stator winding independently of the others, and in synchronism with the pulses from the generator 90.

As mentioned previously, the direction in which the rotor is rotated is determined by the order in which the four phases of the stator winding are sequentially energized. To control this direction, a directional input signal is supplied to the directional input 89a of the counter 89; this type of input is conventionally included as a part of commercially available up-down counters and simply requires an input of a first level to produce counter output signals in the order 85–86–8-7–88, and of a second level to produce output signals in the reverse order 88–87–86–85.

To limit the voltage across the transistors 75–78, a resistor-diode combination is connected across each of the stator windings 70a–70d. Thus, a resistor 91 and diode 95 are connected across the winding 70a connected to the collector of transistor 75, and resistors 92–94 and diodes 96–98 are similarly connected across the other three windings 70b–70d. The diodes 95–98 normally prevent current from bypassing the stator windings 70a–70d through the resistors 91–94, but when an inductive voltage spike is produced in one of the windings, due to turning off one of the transistors for example, the corresponding diode conducts current through the resistor connected thereto so as to protect the corresponding transistor from excessive voltage which might permanently damage the transistor.

It will be appreciated that the rotor assembly in the illustrative motor is freewheeling when all phases of the stator windings are all de-energized, and thus the width of the pulses that turn on the transistors to energize the stator winding must be long enough to hold the rotor assembly in position for the desired length of time. Thus, when the rotors are stepped sequentially by a continuing series of pulses, the trailing edge of each pulse should substantially coincide with the leading edge of the next pulse so that the rotors are under substantially continuous control of the stator winding. The pulse width must also be sufficient to allow the rotor assembly to step before the next stator winding is energized; the time required for the rotor assembly to step is dependent not only on the inertia of the rotor assembly, but also on the magnitude of the energizing voltage, i.e., the larger the voltage the faster the angular motion of the rotor assembly.

Operation of the illustrative motor in the step mode, as described thus far, is substantially the same as the operation of commercially available step motors manufactured by Warner Electric Brake and Clutch Company, such as the Warner Electric Step Motor SM-024-0035-AA. However, such motors have certain disadvantages when used for high speed slewing, which is an operating mode in which the rotor does not dwell between successive steps, but rather rotates smoothly in synchronism with the excitation pulses applied to the multiple-phase stator winding. More specifically, such motors produce low output torques in the slewing mode, and may also tend to hunt or oscillate unless certain compensating or damping features are employed.

In accordance with one important aspect of the present invention, the step motor includes not only the step mode control means described above, but also continuous mode control means comprising magnetic pole means producing a magnetic field in the air gap between the rotor and stator assemblies, and means for continuously energizing a winding on one of said assemblies to effect continuous rotation of the rotor assembly. Thus, referring to FIG. 8, a mode controller 100 responds to mode command input signals on a line 101 to selectively open or close two switches S1 and S2. The mode controller 100 may take a variety of different forms, such as a relay which closes the switches S1 and S2 when energized and opens the switches when de-energized. When the commanded mode is the step mode, the switches S1 and S2 are open and the system operates in the manner described above, i.e., with the rotor winding de-energized and the multiple phases of the stator winding energized one at a time in sequence.

When the commanded mode is the continuous mode, the switches S1 and S2 are closed. The closing of switch S1 supplies a continuous enabling signal from line 102 to all four of the OR circuits 81–84 simultaneously, thereby actuating or turning on all four transistors 71–74 at the same time to continuously and simultaneously energize all four stator windings 70a–70d. At the same time, the closing of switch S2 connects the continuous d-c. voltage source V across the brushes 110 and 111 of a conventional commutator 112 to energize a rotor winding 113 that is wound around the teeth of all four rotors 50a–50d on the outer surface of the spacer sleeves 55a–55e. In this mode, the motor operates as a d-c. shunt motor, with the rotors of all four phases A, B, C and D rotating continuously at a high speed and producing a high output torque.

More specifically, the continuous energization of all four phases of the stator winding 70 produces magnetic poles of alternating polarity around each of the stator sections 40a–40d, thereby producing a stationary radial magnetic field in the air gap between the rotor assembly and all four phases of the stator assembly. The continuously energized rotor winding 113 is exposed to the magnetic field produced by the stator assembly, thereby developing a torque which drives the rotor in a predetermined direction. With the particular rotor and stator configuration illustrated, the motor is self-starting. As the rotor rotates, the commutator changes the external d-c. current from the source V to internal a-c. current in the rotor winding 113 so that the direction of current flow in the winding 113 changes as the rotor passes the magnetic poles of opposite polarity formed by the stator; consequently, the rotor assembly is continuously driven in the same direction as long as both the rotor and stator windings are energized.

Returning to FIGS. 1 and 2 for a description of the physical structure of the commutator 112 and the rotor winding 113, the rotor winding 113 is wound in the axial direction between the axially aligned teeth of all four rotors 50a–50d. To insulate the inner surface of the winding 113, an insulating sleeve 114 is disposed between the winding 113 and the aluminum spacer sleeves 55a–55e, extending through the spaces between the rotor teeth. A similar insulating sleeve 115 surrounds the outside surface of the winding 113, and suitable fastening means such as windings of wire 116 are wrapped around the sleeve 115 to hold the rotor winding in place.

The commutator 112 is mounted on the left end of the motor shaft 53, as viewed in FIG. 1, with the brush 110 held within a brush holder 117 telescoped within an insulating sleeve 118 extending radially through the end plate 58. The other brush 111 is mounted in a similar manner, although it is not shown in FIG. 1. To connect the brush 110 to the desired d-c voltage source V externally of the motor, a lead 118 connects the brush 110 to a terminal 120 threaded into the outer end of the insulating sleeve 118.

In FIGS. 9–12 there are illustrated alternative embodiments of the invention in which the stator poles are magnetized by permanent magnets so that there is no need to energize the stator windings when the motor is operating in the continuous mode. Thus, in the embodiment of FIGS. 9 and 10, a ceramic permanent magnet 130 is mounted at the radially outer end of each stator pole 131, comprising a laminated stack of thin soft iron plates. Each magnet 130 is polarized in the radial direction with adjacent magnets having poles of opposite polarity facing the contiguous stator poles 131. For example, in FIG. 10 magnets 130a and 130c have their north poles facing the corresponding stator poles 131a and 131c, while magnet 130b has its south pole facing the corresponding stator pole 131b. Consequently, the permanent magnets 130 provide adjacent poles in each of the four stators in the motor of FIGS. 9 and 10 with opposite polarities, just as the windings 70 provide adjacent stators 40 with opposite polarities in the motor of FIG. 1, to form magnetic poles of alternating polarity around the rotor assembly.

Figure 9:
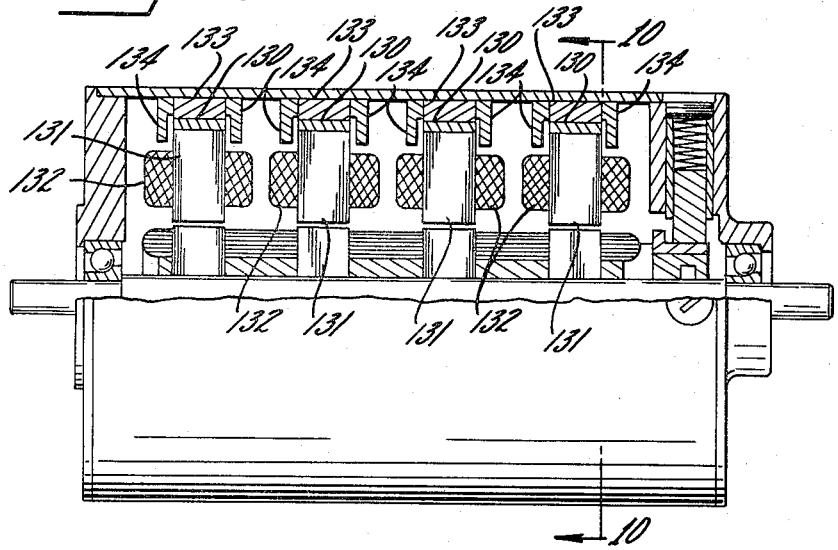
FIG. 9 is a side elevation, partially in section, of another electric motor including a modified embodiment of the invention.
Figure 10:
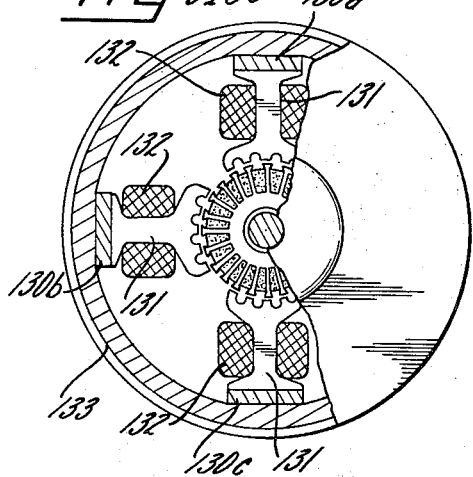
FIG. 10 is a section taken along line 10—10 in FIG. 9.

To operate the motor of FIGS. 9 and 10 in the stepping mode, windings 132 on the four stator sections are energized in the same manner described above for the stator windings 70 in the motor of FIG. 1. The rotor assemblies are identical in the two motors, as are the structures of the rotor and stator teeth, so successive energization of the stator windings 132 of the four phases steps the rotor assembly in successive increments of angular displacement corresponding to one-fourth of a tooth pitch. Of course, the energization of the windings 132 on any given stator must produce an electromagnetic effect sufficient to overcome the magnetic flux from the various permanent magnets 130.

When the motor of FIGS. 9 and 10 is operated in the continuous mode, the stator windings 132 are de-energized since the stator poles 131 are already magnetized by the permanent magnets 130. Thus, in the control system of FIG. 8, switch S1 is eliminated so that there is no continuous enabling signal supplied to the OR circuits 81–84.

To protect the permanent magnets 130 from demagnetization due to excess flux from the stator windings 132, the stator assembly includes a flux-conducting ring 133 extending around the outside surfaces of the four magnets associated with each stator, and carrying a pair of spaced fingers 134 extending inwardly along opposite sides of each magnet. The combination of the ring 133 and the fingers 134 provides a flux leakage path around each magnet 130. If desired, the leakage path can be provided around the stator winding 132 associated with each magnet 130, rather than around the magnet, to achieve more efficient magnetization from the magnets.

Figure 12:
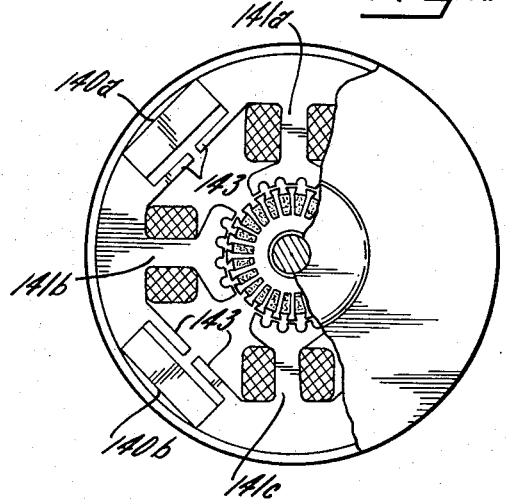
FIG. 12 is a section taken along line 12—12 in FIG. 11.
Figure 11:
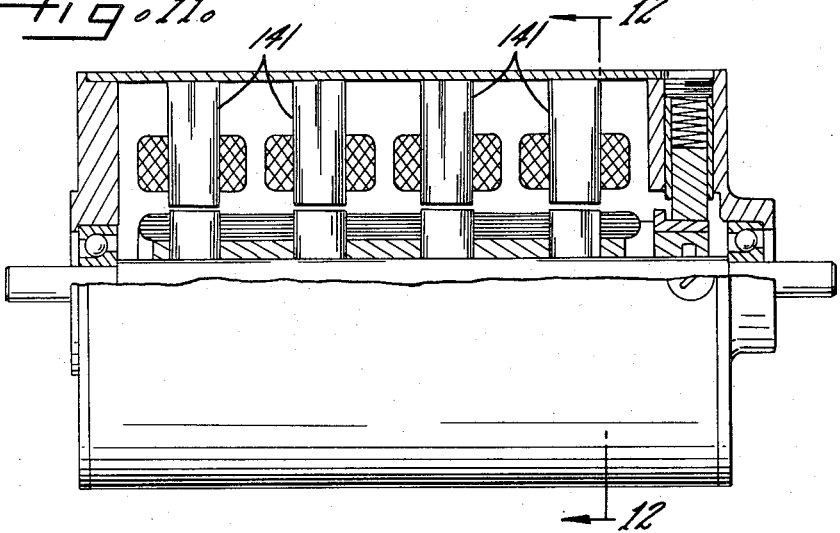
FIG. 11 is a side elevation, partially in section of still another motor including a further modified embodiment of the invention.

Another version of a motor having a permanently magnetized stator is illustrated in FIGS. 11 and 12. In this embodiment, "Alnico" permanent magnets 140 are located between adjacent stator poles 141 and are polarized in the circumferential direction with adjacent magnets polarized in opposite directions. For example, in FIG. 12 adjacent magnets 140a and 140b both have south poles facing the stator pole 141b, while the north poles of the magnets face stator poles 141a and 141c, respectively. To protect the magnets 140 from demagnetization due to excess flux from the stator windings 142, the stator includes a pair of spaced fingers 143 adjacent each magnet to provide a flux leakage path around the magnet. Operation of the motor of FIGS. 11 and 12 in both the stepping and continuous modes is the same as described above for the motor of FIGS. 9 and 10.

While the invention has been described above with specific reference to motors in which the rotor teeth in the various phases are all in axial alignment with each other and the stator teeth are offset from each other, it will be appreciated that the same effect can be achieved by aligning all the stator teeth and offsetting the rotor teeth from phase to phase. The invention has also been described with particular reference to motors having four phases, but it will be understood that the desired directional control can be achieved with the use of only three phases, or with more than four phases. Also, if means are provided to momentarily energize the rotor to control its direction of rotation, only one or two phases may be employed; if only one phase is used, one half the teeth in either the stator or rotor must be offset, and the flux in these teeth must be controlled so that it varies between zero and a certain maximum value. In all of these arrangements, the stator and rotor teeth must be dimensioned so that with flux in all the stator poles the holding or detent torque is low enough to be overcome by the torque produced when the rotor winding is energized for operation in the continuous mode. It will also be understood that motors embodying the principles of this invention may be operated with a-c current instead of d-c as in the embodiments described above.

As can be seen from the foregoing detailed description, this invention provides an electric motor which can be operated either in a step mode for effecting predetermined increments of angular displacement with a detent torque, or in a continuous mode for effecting continuous rotation at high speeds. Tests conducted on the illustrative motor have demonstrated that it can be operated in the continuous mode at a speed in excess of 3,000 steps per second, developing a maximum torque of 225 ounce-inches in the high speed range and a maximum output of 0.5 hp. When operated in step mode, the illustrative motor has been demonstrated to be capable of developing a torque of 100 ounce-inches at 2,000 steps per second. Furthermore, the d-c. torque-speed curves are quite linear.

We claim as our invention:

1. An electric motor adapted for both stepping and continuous operation, said motor comprising the combination of:
  a. cooperating stator and rotor assemblies forming an air gap therebetween,
  b. a multi-phase winding on said stator assembly,
  c. a winding on said rotor assembly and fed by commutating means,
  d. step mode control means including means for de-energizing said commutator-fed rotor winding and energizing the multiple phases of said stator winding in sequence to effect stepping rotation of the rotor assembly in synchronism with the sequential energization of the multiple phases of said stator winding,
  e. continuous mode control means including means for producing a constant magnetic field from said stator assembly in said air gap and means for continuously energizing said commutator-fed rotor winding to effect continuous rotation of the rotor assembly, and
  f. mode selection means for selectively enabling said step mode control means or said continuous mode control means.

2. An electric motor as set forth in claim 1 wherein said means for continuously energizing said rotor winding includes a d-c. voltage source and a commutator connected between said source and said rotor winding for converting d-c. current from said source to a-c. current in said rotor winding in response to rotation of said rotor assembly.

3. An electric motor as set forth in claim 1 wherein the stator assembly includes a plurality of magnetic poles of alternating polarity disposed around the rotor assembly.

4. An electric motor as set forth in claim 1 wherein the stator assembly includes a plurality of magnetically independent toothed stator sections spaced axially along the rotor assembly with the teeth in each stator section circumferentially offset from the teeth in each of the other stator sections, each of said stator sections being connected to one of the phases of said multi-phase winding, and said rotor assembly is also toothed whereby sequential energiztion of the toothed stator sections effects stepping rotational movement of the rotor assembly.

5. An electric motor as set forth in claim 4 wherein the circumferential offset of the teeth of said stator sections is equal to the pitch of the rotor teeth divided by the number of stator sections.

6. An eletric motor as set forth in claim 4 wherein each stator section is wound to produce a plurality of magnetic poles of alternating polarity around the rotor assembly in response to energization of the stator winding.

7. An electric motor as set forth in claim 4 wherein each stator section includes permanent magnets for producing a plurality of magnetic poles of alternating polarity around the rotor assembly.

8. An electric motor as set forth in claim 4 which includes at least three of said stator sections.

9. An electric motor as set forth in claim 4 wherein the teeth of said rotor and stator assemblies have the same pitch.

10. An electric motor as set forth in claim 4 wherein each stator section has four pole members equally spaced around the circumference of the stator, each of said pole members forming a plurality of stator teeth, and the stator winding is wound around each of said pole members so that energization of said winding magnetizes each adjacent pair of said pole members with opposite polarities.

11. An electric motor as set forth in claim 1 wherein said means for energizing the multiple phases of said stator winding in sequence includes a pulse generator for producing pulses and circuit means responsive to said pulses for sequentially energizing the separate phases of said multi-phase winding.

12. An electric motor as set forth in claim 11 wherein said circuit means includes a voltage source, a plurality of electronic switching means connected from said source to said multi-phase winding, and means for supplying said pulses to said plurality of switching means in sequence, for rendering said switching means conductive to sequentially energize the separate phases of said multi-phase winding.

13. An electric motor as set forth in claim 12 wherein each of said electronic switching means comprises a transistor.

14. An electric motor as set forth in claim 12 wherein said means for suplying said pulses to said switching means in sequence comprises an up-down counter connected to said pulse generator.

15. An electric motor as set forth in claim 1 wherein said means for producing a constant magnetic field in said air gap comprises means for simultaneously energizing all phases of said stator winding with a constant d-c. signal.

16. An electric motor as set forth in claim 1 wherein said means for producing a constant magnetic field comprises permanent magnetic portions of said stator assembly.

17. An electric motor adapted for both stepping and continuous operation, said motor comprising the combination of a stator assembly including at least three magnetically independent stator sections spaced along a common axis with each section forming a plurality of magnetic poles of alternating polarity around the circumference thereof and having a plurality of teeth with the teeth of each section circumferentially offset from the teeth of one of the other sections by a distance equal to the tooth pitch divided by the number of stator sections; a multi-phase stator winding having a separate phase wound on each of said stator sections; a d-c. voltage source; a plurality of electronic switching means connected in circuit with said source and each phase of said stator winding for selectively energizing each of said phases indpendently of the others; a magnetically permeable rotor assembly journalled for rotation within all said stator sections and having teeth with the same pitch as the teeth on said stator section, said rotor and stator assemblies forming an air gap therebetween; a winding wound on said rotor assembly between the teeth thereof; a commutator connected from said source to said rotor winding for converting d-c. current from said source to a-c. current in said winding in response to rotation of the rotor assembly; switching means for connecting and disconnecting said source to and from said commutator; a plurality of gating means for actuating said electronic switching means to control the energization of the various phases of said stator winding; means for enabling all said gating means at the same time to actuate all said electronic switching means to continuously energize all the phases of said stator winding with a constant d-c. signal to produce a constant magnetic field in said air gap to effect continuous rotation of the rotor assembly when said commutator is connected to said source to continuously energize said rotor winding; pulse generating means for producing pulses to control stepping movement of the rotor assembly; and counting means responsive to said pulses for producing output signals sequentially on a series of output lines for enabling said plurality of gating means in sequence to actuate said electronic switching means in sequence, thereby energizing the various phases of said stator winding in sequence to effect stepping rotation of the rotor assembly in synchronism with said pulses when said commutator is disconnected from said source to de-energize said rotor winding.

* * * * *